2 Sheets--Sheet 1.
T. F. ALLYN.
Improvement in Springs for Railroad-Cars.
No. 4,959. Reissued July 2, 1872.
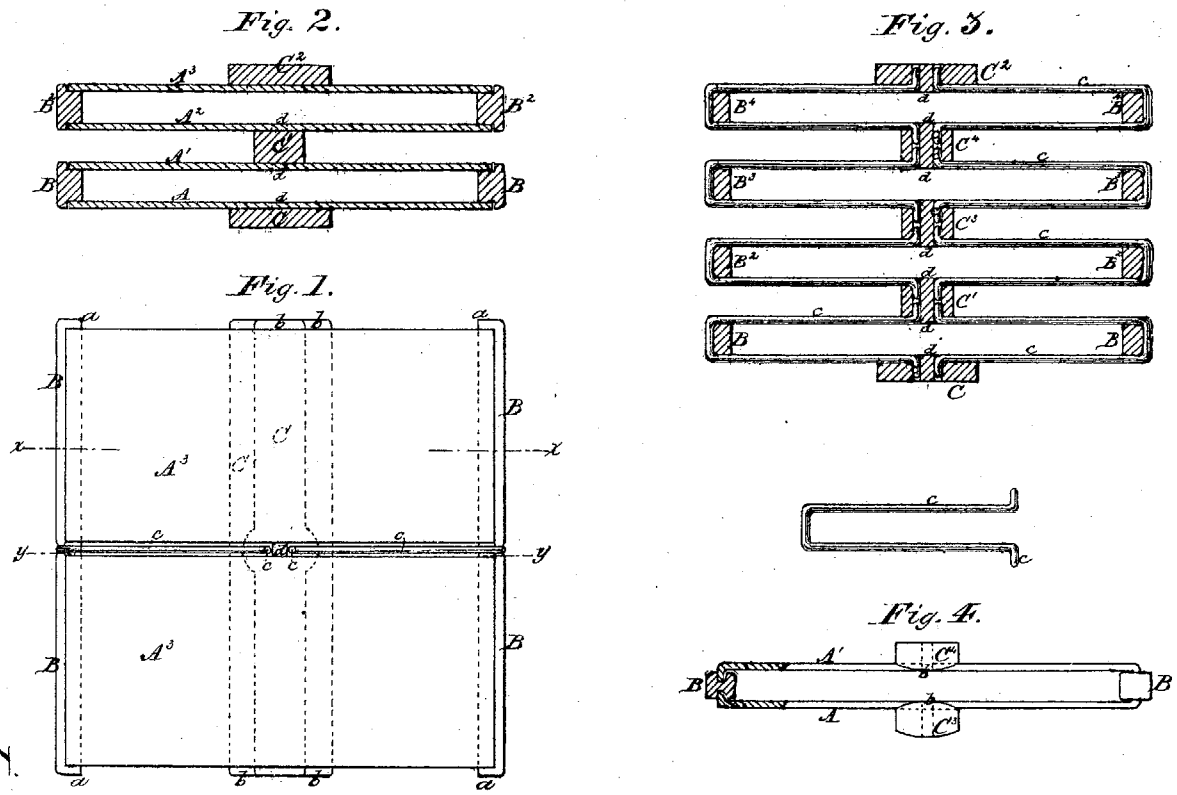
Witnesses:
H. K. Millspaugh
C. G. Allyn
Inventor:
T. F. Allyn
AM. PHOTO-LITHOGRAPHIC CO. N.Y. (OSBORNE'S PROCESS.)

2 Sheets--Sheet 2.
T. F. ALLYN.
Improvement in Springs for Railroad-Cars.
No. 4,959. Reissued July 2, 1872.
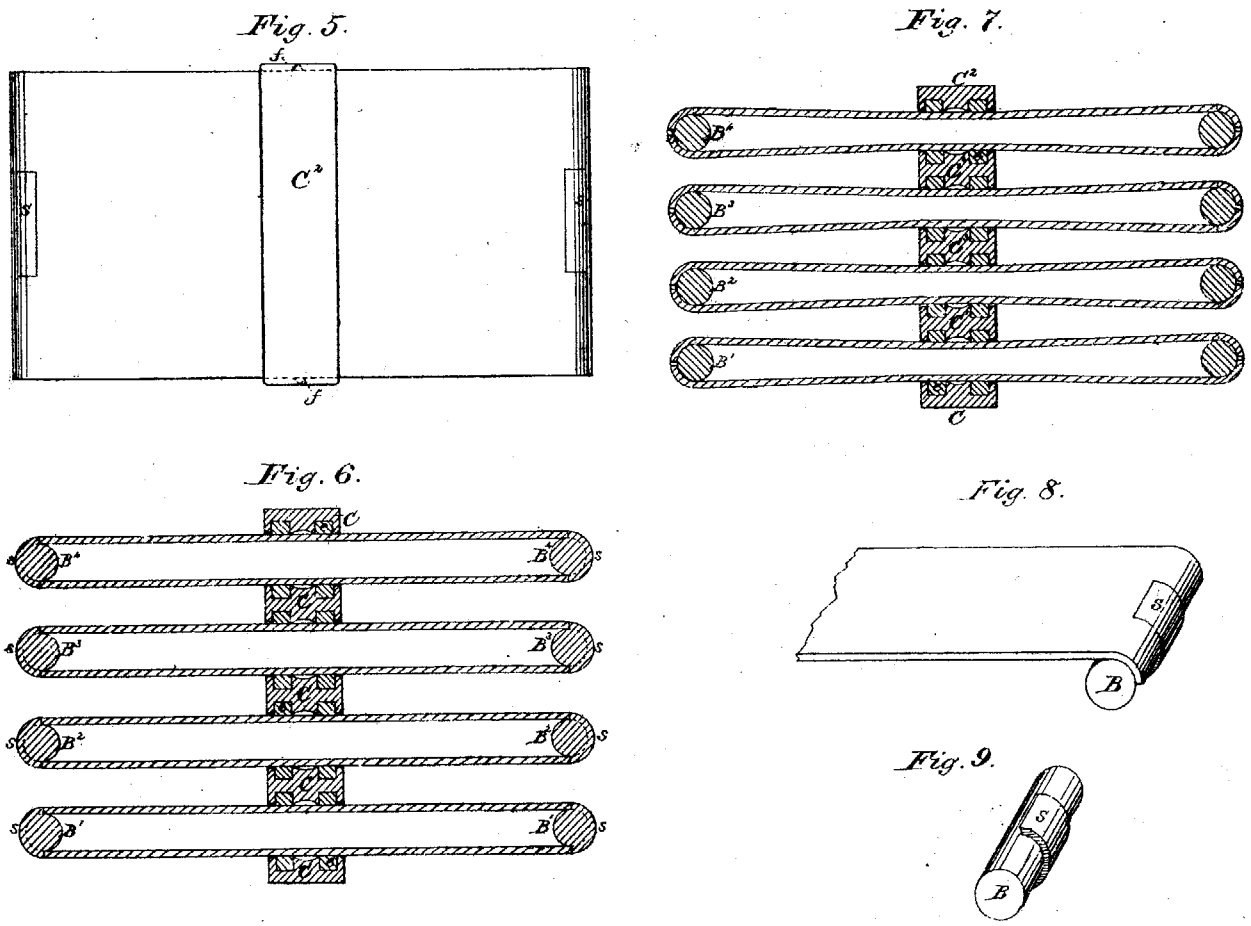
Witnesses:
C. D. Millspaugh
Chas. Allyn
Inventor:
T. F. Allyn
AM. PHOTO-LITHOGRAPHIC CO. N.Y. (OSBORNE'S PROCESS.)

UNITED STATES PATENT OFFICE.

TIMOTHY F. ALLYN, OF NYACK, NEW YORK, ASSIGNOR, BY MESNE ASSIGNMENTS, TO COMBINATION CAR-SPRING COMPANY.

IMPROVEMENT IN SPRINGS FOR RAILROAD-CARS.

Specification forming part of Letters Patent No. 98, dated January 15, 1861; reissue No. 4,959, dated July 2, 1872.

*To all whom it may concern:*

Be it known that I, TIMOTHY F. ALLYN, of Nyack, county of Rockland and State of New York, but formerly of Dyersville, county of Dubuque and State of Iowa, have invented a new and useful Improvement in Railroad Car-Springs; and I do hereby declare that the following is a full, clear, and exact description of the same, reference being had to the accompanying drawing forming a part of this specification, and in which—

Figure 1 is a plan or top view of my improved railway car-spring. Fig. 2 is a vertical transverse section of the same in the line *x x* of Fig. 1. Fig. 3 is a similar section in the line *y y* of Fig. 1. Fig. 4 shows a different method of holding the plates of the spring together. Figs. 5, 6, 7, 8, and 9 represent a modification of my improved spring.

Similar letters of reference in each of the figures indicate corresponding parts.

The nature of my invention consists in the mode of arranging and holding together metallic plates and cross-bars or fulcrums so as to form a car-spring which shall work without producing friction between or abrasion of its parts.

To enable others skilled in the art to make and use my invention, I will proceed to describe its construction and operation.

A $A^1$ $A^2$ $A^3$ represent the metallic spring-plates; B $B^2$, the end-connecting cross-bars or fulcrums; and C $C^1$ $C^2$, the central connecting cross-bars or fulcrums; and *c*, the hooks that help to hold the spring together. The spring-plates may be flat or bent at their ends in a rectangular or other desired form, so as to fit and connect with the end cross-bars or fulcrums. In Figs. 1 and 2 the end cross-bars or fulcrums are represented of T-form, and with a jog or shoulder, *a*, at each end, both at top and bottom. The central connecting cross-bars or fulcrums are of rectangular form in their transverse section, and also have a jog or shoulder, *b*, at both their ends to hold the plates transversely. The hooks *c*, by clasping the end cross-bars or fulcrums and hooking into the central cross-bars or fulcrums, hold the spring together longitudinally.

To arrange the plates A $A^1$ $A^2$ $A^3$, the lower plates A are placed upon the lower central cross-bar or fulcrum C. The end cross-bars or fulcrums B B are placed upon the ends of the plates A. The second plates, $A^1$, rest on the cross-bars B B, and their ends fit into the upper shouldered recesses of the same. The cross-bar $C^1$ is placed on the plates $A^1$, and upon this cross-bar the plates $A^2$ are placed, their ends fitting into the shouldered recesses of the end bars $B^2$ $B^2$. The hooks *c* must be placed alternately in their proper positions, as before described. The plates $A^3$ and cross-bars $B^2$ $B^2$ are added. On top of plates $A^3$ the central cross-bar $C^2$ is placed, and upon this bar the incumbent weight is placed or attached, which is to be sustained by the spring. By continuing to add plates and cross-bars, as described, a spring of any desired volume may be produced.

I have thus far described the springs as made in two pieces or double, but they may be made in single pieces and be confined together by the hooks *c*, connecting at the ends of the cross-bars instead of connecting at their centers.

In Figs. 5, 6, 7, 8, and 9 a modification of the spring just described is shown. The difference in the construction here adopted is the formation of a teat or lug, *f*, Fig. 5, on each side of the plates, and of recesses for the same to fit into in the central cross-bars A, and also of a semicircular projection, S, on the end cross-bars or fulcrums B $B^1$ $B^2$ $B^3$, which, in this case, are round, and there are corresponding open slots in the ends of the plates, which ends are bent in the form of a quadrant so as to fit the cross-bars and hold them together, thus dispensing with the hooks and angular-shouldered recesses shown in Fig. 4. I also introduce India rubber or other suitable packing *e e* between the plates and the central cross-bars C, Fig. 7, by means of which the action of the plates upon the cross-bars or bearings is materially softened as the bearing becomes extended or enlarged by the spreading or yielding of the packing under the increased pressure, and the packing being let into recesses formed in the cross-bars or bearings for the purpose, as represented, is securely held in place.

By arranging metallic spring-plates and the cross-bars or fulcrums in the manner described, short plates of, say, from ten to sixteen inches in length, may be used, and by this arrangement also the whole strength of the plates is retained, for it is not necessary to pass bolts through them; neither is any part of the spring in contact with a surface whereby a sliding motion or lateral friction or abrasion will be produced. The bearings of the plates upon the cross-bars being at right angles to the plates, they will work freely over or under the cross-bars or fulcrums, and the said cross-bars or fulcrums have no oscillating motion, but act or serve as pivots or rests, over and under which the plates deflect when the spring is in motion or action.

Having thus described my invention, what I claim as new therein, and desire to secure by Letters Patent of the United States, is—

1. A car-spring composed of plates or equivalent forms, held apart by the described arrangement of fulcrums, when the parts are constructed to hold each other in place without bolts, substantially as set forth.

2. I claim, in combination with metallic spring-plates, the central cross-bar or bearing and its India-rubber or elastic packing, substantially as described.

T. F. ALLYN.

Witnesses:
A. D. MORFORD,
H. Q. SANDERSON.